United States Patent [19]
Lötscher

[11] 4,288,793
[45] Sep. 8, 1981

[54] APPARATUS CONTAINING A CYLINDER WITH A DISPLACEABLE PISTON THEREIN AND A MEASURING TRANSDUCER ARRANGED ESSENTIALLY WITHIN THE CYLINDER

[75] Inventor: Bernhard Lötscher, Andelfingen, Switzerland

[73] Assignee: Rotovolumetric AG, Ebikon, Switzerland

[21] Appl. No.: 32,335

[22] Filed: Apr. 23, 1979

[30] Foreign Application Priority Data

May 11, 1978 [CH] Switzerland .................. 5125/78

[51] Int. Cl.³ .................. G08C 19/10; G01L 9/12
[52] U.S. Cl. .................. 340/870.37; 73/745; 73/DIG. 6; 324/61 R; 340/620
[58] Field of Search .............. 340/200, 603, 606, 611, 340/612, 618, 626, 620, 870.37; 324/61 R; 323/93; 318/662; 73/714, 718, 725, 745, DIG. 6, 194 E

[56] References Cited
U.S. PATENT DOCUMENTS

| | | | |
|---|---|---|---|
| 3,564,397 | 2/1971 | Sargent et al. | 340/200 |
| 3,774,238 | 11/1973 | Hardway | 324/61 R |
| 3,784,897 | 1/1974 | Norrie | 340/200 |
| 3,928,796 | 12/1975 | Kaiser | 323/93 |

FOREIGN PATENT DOCUMENTS

| | | |
|---|---|---|
| 1813153 | 6/1969 | Fed. Rep. of Germany. |
| 2820040 | 11/1978 | Fed. Rep. of Germany. |
| 1525363 | 4/1968 | France. |

OTHER PUBLICATIONS
*Machine Design*, vol, 31, No. 26, Dec. 1959, p. 99.

*Primary Examiner*—James J. Groody
*Attorney, Agent, or Firm*—Werner W. Kleeman

[57] ABSTRACT

An apparatus containing a cylinder with a piston displaceably guided therein and positionally adjustable by a hydraulic fluid medium. A capacitive measuring transducer is arranged in the cylinder. The measuring transducer comprises a tube attached at the piston and arranged in a longitudinal opening thereof. The tube is electrically conductively connected with the cylinder. Apart from the tube, the measuring transducer further comprises a rod protruding into the tube and insulatingly secured at the cylinder. This rod is connected by means of an electrical bushing or lead with the input of an electronic unit attached externally at the cylinder. The electronic unit comprises an oscillator having a connection electrically coupled with the cylinder and a connection coupled with the non-inverting input of a capacitive feedback differential amplifier. The inverting input of the differential amplifier is electrically connected with the rod which is secured so as to be electrically insulated at the cylinder.

9 Claims, 3 Drawing Figures

U.S. Patent  Sep. 8, 1981  4,288,793
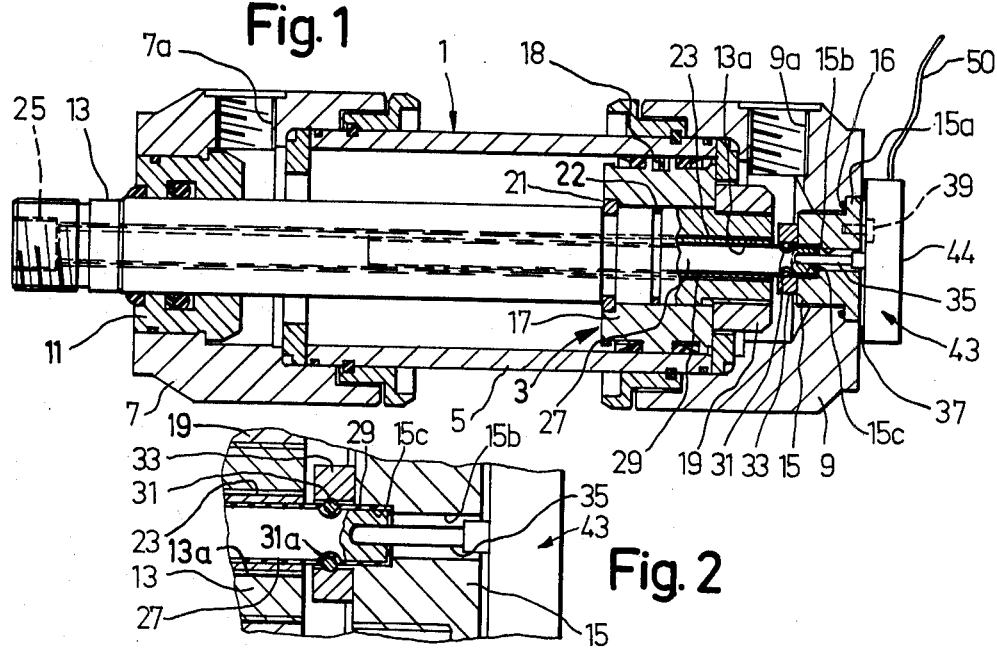
Fig. 1
Fig. 2
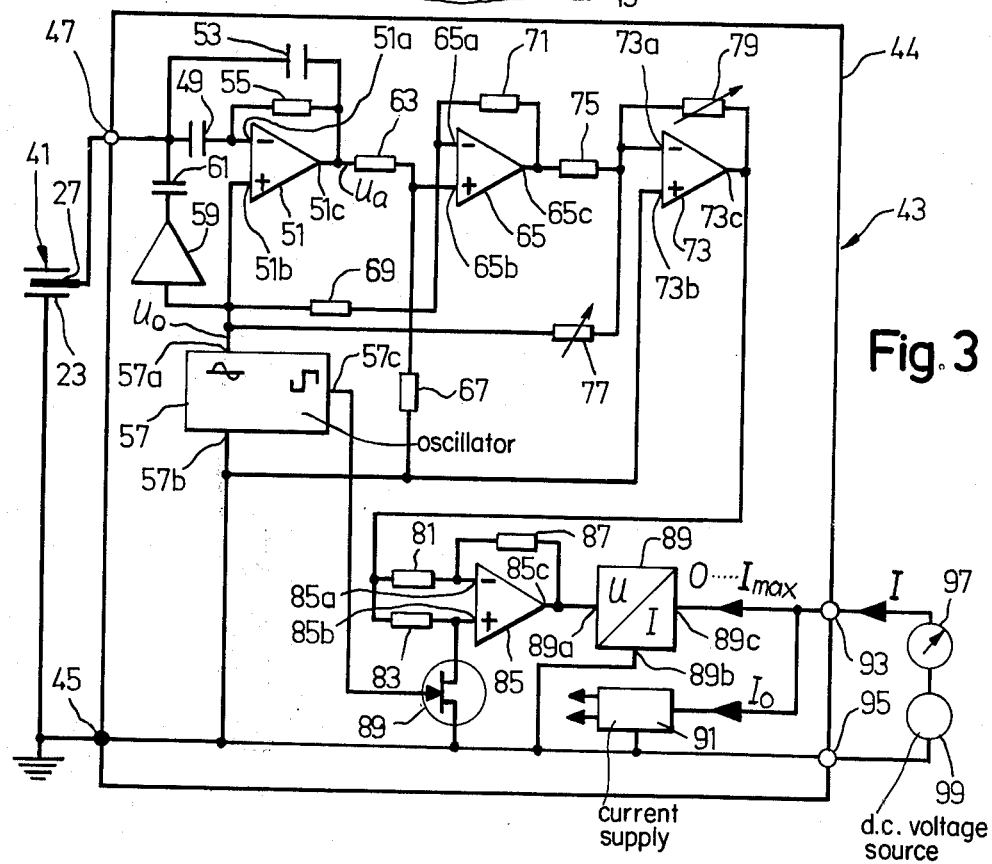
Fig. 3

APPARATUS CONTAINING A CYLINDER WITH A DISPLACEABLE PISTON THEREIN AND A MEASURING TRANSDUCER ARRANGED ESSENTIALLY WITHIN THE CYLINDER

BACKGROUND OF THE INVENTION

The present invention relates to an apparatus containing a cylinder, a piston displaceable in the cylinder, and a measuring transducer arranged essentially within the cylinder.

In its more specific aspects, the invention relates to an apparatus comprising a cylinder, a piston displaceably guided in such cylinder, the piston being positionally shiftable by a suitable flow medium and having an elongate or longitudinal opening. Further, there is provided a measuring transducer arranged essentially within the cylinder and having two parts which are displaceable towards one another, one such part being attached at the cylinder and protruding into the longitudinal opening of the piston, and the other such part being secured at the piston or being constituted by the piston itself.

Such cylinder arrangements are used, by way of example, for lifting loads, for shutting off closures or for positioning tools of building and machine tools.

Swiss Pat. No. 488,999 and the corresponding U.S. Pat. No. 3,654,549, disclose an apparatus containing a cylinder and a measuring transducer installed within such cylinder. With one embodiment of the state-of-the-art equipment there is used an inductive measuring transducer having one part secured at the cylinder and the other part at the piston. The part of the measuring transducer which is secured at the cylinder comprises two hollow tandemly arranged coils disposed essentially coaxially with respect to the cylinder. The measuring transducer part attached at the piston comprises a ferromagnetic core, which, depending upon the position of the piston, penetrates to a greater or lesser extent into both coils. Both of these coils are connected with an alternating-current source and a bridge circuit, from which there can be tapped-off a signal constituting a measure for the piston position.

The coils required for the heretofore known equipment are relatively expensive. This is particularly then the case if the piston has a large displacement stroke. A further drawback of the prior art equipment resides in the fact that, at least three coil connections must be led out of the cylinder by means of electrically insulating bushings or equivalent structure. These bushings are particularly then expensive and prone to disturbance if large pressures are used in the cylinder. It is furthermore to be mentioned that an apparatus working with inductive measuring transducers can be sensitive to external magnetic fields and ferromagnetic parts of other machines, so that measurement errors can easily arise.

SUMMARY OF THE INVENTION

Therefore, it is a primary object of the present invention to provide apparatus of the previously mentioned type which is not susceptible to the aforementioned drawbacks and limitations of the prior art constructions.

Another and more specific object of the present invention aims at the provision of an apparatus which can be fabricated at low costs, is insensitive to disturbing or extraneous influences caused by other equipment and machines, and wherein particularly there is only required a single electrically insulated bushing or lead.

Now in order to implement these and still further objects of the invention, which will become more readily apparent as the description proceeds, the apparatus of the present development comprises a cylinder and a piston having an elongate or longitudinal opening and displaceably guided in such cylinder. The piston can be positionally shifted within the cylinder by means of a suitable flow medium. Further, a measuring transducer is arranged essentially within the cylinder. This measuring transducer comprises two parts or elements which can be displaced towards one another. One of these parts is attached at the cylinder and protrudes into the longitudinal opening of the piston, whereas the other part is secured at the piston or formed by the piston itself. The measuring transducer is a capacitive measuring transducer. One of both parts of the measuring transducer is electrically conductively connected with metallic parts of the cylinder and piston and the other of the two parts of the measuring transducer is provided with an electrical connection leading out of the cylinder and electrically insulated with respect to the cylinder and the piston.

Since the one electrode of the measuring transducer is electrically conductively connected by means of the piston and the cylinder with the electronic unit, only a single electrically insulated bushing or lead, or equivalent structure, must be led out of the interior of the cylinder. The cylinder, essentially formed of metal and connected with the ground terminal or connection of the electronic unit, additionally forms a Faraday cage which extensively eliminates disturbances caused by external or foreign electrical fields. The capacitance of the measuring transducer therefore can be measured while using an alternating-current having a relatively low frequency. This, in turn, again renders possible measuring the capacitive changes by means of a capacitive negative feedback differential amplifier.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view through a cylinder containing a capacitive measuring transducer;

FIG. 2 is an enlarged sectional detail showing of part of the arrangement of FIG. 1; and FIG. 3 is an electrical circuit diagram of the electronic unit of the apparatus shown in FIG. 1.

DETAILED DESCRIPTION OF THE PREFERRED EMBODIMENTS

Describing now the drawings, in FIG. 1, reference character 1 designates a cylinder and reference character 3 a piston displaceably guided within such cylinder 1. The cylinder 1 essentially consists of metallic, electrically conductive parts or elements, and, in particular, contains a metallic jacket or shell 5 which is provided at both opposed ends with likewise metallic caps or closures 7 and 9. Inserted into the cap or closure 7 is a metallic bushing 11 equipped with different not particularly referenced sealing rings and forming a sealed sliding guide for the metallic piston rod 13 at the piston 3. Threaded into the cap or closure 9 is a metallic bushing 15 possessing external threading or threads. This bushing 15 is provided with a collar 15a and by means of the latter, in conjunction with a seal 16, is tightly sealed with respect to the cap 9. The longitudinal or elongate opening 15b of the bushing 15 is provided at its end confronting the internal chamber or compartment of the cylinder 1 with a widened portion 15c. Further, the caps 7 and 9 are provided with connection openings 7a and 9a, respectively, for the infeed and withdrawal of an electrically insulating flow medium, for instance, hydraulic oil, which serves to pressure impinge the piston 3 and to displace the latter. It is possible to work, by way of example, with a pressure up to 300 bar.

At the end of the piston rod 13 located internally of the cylinder 1, there is sealingly secured a metallic ring 17 by means of a nut 19 threaded onto the rod 13, a spring ring 21 and a seal 22. The ring 17 forms the head of the piston 3 and is displaceably and sealingly guided within the jacket 5. Ring 17 is provided with a recess at the region of its cylindrical sliding surface, within which there is arranged a resilient sliding contact 18 forming an electrically conductive connection between the ring 17 and the jacket 5. The piston 3, or more exactly stated, the rod 13, is equipped with a continuous longitudinal or elongate opening 13a formed by a bore coaxially arranged with respect to the cylinder jacket 5. Within the longitudinal opening 13a there is arranged a metallic, electrically conductive cylindrical tube or pipe 23 which is coaxially arranged with respect to the cylinder jacket 5. This tube 23 has, in particular, an exactly cylindrical inner surface. The one end of the tube 23 is flushly connected with the inner piston end, i.e., with that end of the rod 13 at which there is secured the ring 17. The other end of the tube 23 is provided with a plug 25 or equivalent structure, which is threaded into the outer end of the rod 13 in a widened portion of the longitudinal opening 13a and tightly closes the same. The tube 23 is provided at the region of its attached end with at least one opening for the pressure equalization of the hydraulic fluid medium. The tube 23 forms the one electrode of a capacitive measuring transducer and is electrically conductively connected with the piston 3 which is metallic, except for the sealing rings, and by means of such piston 3 conductively connected with the metallic parts of the cylinder 1 and particularly the cylinder jacket 5.

The other electrode of the capacitive measuring transducer is formed by a metallic, electrically conductive, round rod 27 arranged within and essentially coaxially with respect to the cylinder 1. This round or circular rod 27 is provided with a jacket or sheath 29 formed of electrically insulating, fluoro-containing plastic, for instance polytetrafluoroethylene. The one end of the rod 27 is seated in widened portion 15c of the bushing longitudinal opening 15b, as particularly clearly apparent from the showing of FIG. 2. The rod 27 is provided with an essentially ring-shaped groove 31a at that location where it protrudes out of the bushing 15. Into this groove there is inserted a spring ring 31 which, in turn, is retained by a metallic ring 33 which is fixedly threaded by screws or equivalent fastening expedients at the bushing 15. The jacket or sheath 29, which extends up to the one end face of the rod end seated in the bushing 15, insulates the rod 27 with respect to the bushing 15 and also the spring ring 31 and at the same time serves as a seal. Hence, the rod 27 is secured so as to be immobile and sealingly at the cylinder 1 and is electrically insulated with regard to such cylinder. Rod 27 protrudes into the tube or pipe 23 and extends up to the region of the end of the cylinder jacket 5 facing away from the cap or closure 9. The rod 27, for each possible position of the piston 3, thus partially protrudes into the longitudinal opening 13a and the pipe 23. The jacket 29 fixedly seated upon the outer surface of the rod 27 and the inner surface of the tube 23 collectively form a sliding seat which is essentially free of play. During operation of the cylinder 1 hydraulic oil or any other suitable fluid medium flows between the jacket 29 and the inner surface of the tube 23, so that there is formed an oil film. The dielectric of the capacitive measuring transducer is formed by the jacket or sheath 29 and this oil film. The jacket or sheath 29 is constructed in such a fashion that its thickness is approximately 3 to 10 times greater than that of the oil film. Between the outer surface of the tube 23 and the inner surface of the longitudinal opening 13a, while discounting the attachment location at the plug 25, there is present a free ring-shaped or annular gap. Furthermore, the tube 23 consists of a relatively thin-wall, resiliently flexible material, so that it can be automatically centered by the rod 27.

At the cylinder 1 there is attached an electronic unit or electronic portion 43 having a sealed metallic housing 44, the attachment being accomplished, for instance, by screws 39 or equivalent fastening devices which threadably connect the electronic unit 43 at the bushing 15. At that location where the edge of the electronic unit 43 bears against the end surface of the cap 9, there is arranged a sealing ring 37. The one end of an electrically conductive pin 35 is secured at the rod 27. This pin 35 piercingly extends through the bushing 15 without contact and, while insulated with respect to the housing 44, extends into the electronic unit 43. This electronic unit 43 is connected, as will be explained more fully hereinafter, by means of a two-wire cable 50 with further elements.

The tube 23 attached at the piston 3 and the rod 27 secured to the cylinder 1, as already mentioned, collectively form a capacitive measuring transducer whose capacitance is dependent upon the piston position. If the piston 3 is located in the illustrated position, where it is introduced as far as possible into the cylinder 1, then the capacitance of the measuring transducer assumes its maximum value. In the other piston position the capacitance of the measuring transducer, to which there is added also the capacitance of the lead or bushing, assumes its minimum value. If the piston 3 is displaced, in the showing of FIG. 1, from the left towards the right, then the capacitance of the measuring transducer linearly increases. The electronic unit 43, during operation, produces an electrical signal, namely an impressed current constituting a measure for the piston position and the piston displacement.

The construction and mode of operation of the electronic unit 43 will now be explained on the basis of the circuit shown in FIG. 3. Here, reference character 41 schematically represents the capacitive measuring transducer. The electrode of the measuring transducer 41, formed by the tube 23, is electrically conductively connected with the cylinder 1 by means of the piston 3 and, in particular, the sliding contact 18. The cylinder 1, in turn, is connected by means of the screws 39 or the like with the metallic housing 44 and with the ground connection 45 of the electronic unit 43. The electrode of the measuring transducer 41, and which electrode is formed by the rod 27 attached at the cylinder 1, is conductively connected, by the pin 35, with the input or measuring connection 47 of the electronic unit 43. The input connection 47 is coupled by means of a capacitor 49 with the inverting input 51a as well as by means of a feedback capacitor 53 with the output 51c of a differential amplifier 51. The inverting input 51a and the output 51c are furthermore connected by means of a high-ohm resistance 55 with one another and which in conjunction with the capacitor 49 serves for stabilizing the operating point.

The non-inverting input 51b of the differential amplifier 51 is connected with the output 57a of an oscillator 57 which also has an input and output connection 57b coupled with the ground connection 45. The output 57a of the oscillator 57 is furthermore connected by means of an amplifier 59 and a capacitor 61 with the input connection or terminal 47.

The output 51c of the differential amplifier 51 is connected by means of a resistor 63 with the non-inverting input 65b of a differential amplifier 65. The input 65b is furthermore connected by means of a resistor 67 with the ground connection or terminal 45. The inverting input 65a of the differential amplifier 65 is connected by means of a resistor 69 with the oscillator output 57a and by means of a resistor 71 with the differential amplifier-output 65c. The resistors or resistances 63 and 69 have the same resistance value. The resistors 67 and 71 likewise have the same resistance value, and the latter amounts to, for instance, the ten-fold of the resistance value of the other resistances 63 and 69.

The inverting input 73a of a differential amplifier 73 is connected by means of a resistor 75 with the differential amplifier-output 65c, by means of a trimmer resistor 77 with the oscillator output 57a and by means of a trimmer resistor 79 with the differential amplifier-output 73c. The non-inverting input 73b of the differential amplifier 73 is electrically speaking at ground.

The differential amplifier-output 73c is connected by means of two resistors 81 and 83 having the same resistance value, with the inverting input 85a and the non-inverting input 85b, respectively, of a differential amplifier 85. The inverting input 85a is connected by means of a feedback resistance 87, having the same resistance value as the resistors 81 and 83, with the differential amplifier-output 85c. The non-inverting input 85b is connected by means of the source-drain path of a field-effect transistor 89 with the ground connection 85. The gate of the field-effect transistor 89 is connected with the output 57c of the oscillator 57.

The differential amplifier-output 85c is connected with the input 89a of a voltage-current converter 89. The connection or terminal 89b of the converter 89 is coupled with the ground connection 45 and its output 89c with a current supply device 91 as well as with the connection 93 of the electronic unit 43. The connection 95 of the electronic unit 43 is likewise connected with the current supply device 91 and with the ground connection 45. The current supply device 91 is furthermore connected by the lines or conductors, which have been generally indicated schematically by the arrows, with the different active elements of the electronic unit 43 and supplies thereto, during operation, the requisite supply voltages.

The connection 93 is coupled by means of a line or conductor of the cable 50 and an indicator or display instrument 97 with the one terminal or connection of a direct-current voltage source 99, the other terminal of which is connected by means of the other line or conductor of the cable 50 with the connection or terminal 95. As will be further more fully explained hereinafter, the connections or terminals 93 and 95, on the one hand, form the signal outputs and, on the other hand, the supply voltage connections of the electronic unit or section 43.

In the description to follow there will be explained the mode of operation of the electronic unit 43. During operation the oscillator 57 produces a sinusoidal alternating-current voltage of a magnitude $U_o$ and a frequency of less than 10 kHz, for instance 1 kHz. This alternating-current voltage which appears between the output 57a and the connection 57b is delivered to the non-inverting differential amplifier-input 51b. Furthermore, this voltage is doubled, without any phase shift, by the amplifier 59 and thus delivered in-phase with the voltage infed to the input 51b, by means of the capacitor 61, to the input connection or junction 47. The measuring transducer 41 has a capacitance C during the momentary piston position. When the piston 3 is located in its terminal position, illustrated in FIG. 1, then the capacitance of the measuring transducer 41 assumes the maximum value $C_{max}$. On the other hand, if the piston 3 has assumed its other terminal or end position, at the cylinder end located at the left-hand side of the illustration of FIG. 1, and thus, protrudes as far as possible out of the cylinder 1, then the measuring transducer 41 together with its infeed lines has the minimum capacitance $C_{min}$.

Furthermore, the feedback capacitor 53 has a capacitance $C_{53}$ and the capacitor 61 the capacitance $C_{61}$. At the output 51c of the differential amplifier 51 there is then present, in relation to ground, an alternating-current voltage having the magnitude $U_a$. The output voltage then assumes the value $$U_a = U_o(1 + (C - C_{61})/C_{53}).$$

Now if the capacitance $C_{61}$ of the capacitor 61 is made equal to the minimum capacitance $C_{min}$, then the voltage $U_a$, with the piston position where the measuring transducer has the capacitance $C_{min}$, just assumes the value $U_o$. Now if the piston 3, starting from the aforementioned terminal position, is displaced deeper into the cylinder 1, i.e., towards the right of FIG. 1, then the voltage $U_a$ linearly increases as a function of the piston displacement path. By means of the differential amplifier 65 there is formed and amplified the difference between the potentials or voltages $U_a$ and $U_o$. At the output 65c of the differential amplifier 65 there thus appears as alternating-current voltage, the magnitude of which is proportional to the capacitance increase $C - C_{min}$ of the measuring transducer, which is formed when the piston 3, starting from its previously mentioned terminal position, is shifted towards the right of FIG. 1. In the event that the capacitance of the capacitor 61 should not exactly coincide with the minimum capacitance of the measuring transducer, then this can be compensated by means of the trimmer resistor 77. By means of the trimmer resistor or resistance 79 it is possible to adjust the gain of the differential amplifier 73. The alternating-current signal present at the output 73c of the differential amplifier 73 is now delivered to both of the inputs of the differential amplifier 85. The oscillator 57 delivers to the gate of the field-effect transistor 89 a square wave-a.c. voltage which is in synchronism with the sinusoidal a.c.-voltage present at the oscillator output 57a. Hence, the transistor 89 is thus, in synchronism with the alternating a.c.-voltage, turned-on and turnedoff between its blocking and conductive states. Consequently, the non-inverting differential amplifier-input 85b is alternately switched back and forth between the potential of the differential amplifier-output 73c and electrical ground. The differential amplfier 85 thus alternately functions as a non-inverting and as an inverting amplifier, so that it demodulates the alternating-current voltage infed thereto. The voltage-current converter 89 then generates an impressed current or receives such. Such is proportional to the magnitude of the infed demodulated voltage, and thus, to the capacitance difference $C-C_{min}$ and varies between the values O and $I_{max}$. The current supply device 91 is structured such that it consumes a constant current having the magnitude $I_o$. The current I, displayed by the indicator or display instrument 97, and infed to the connection 93 and 95 by the voltage source 99, thus varies between the values $I_o$ and $I_o+I_{max}$ and constitutes a measure for the piston position. The indicator or display instrument 97 and the voltage source 95, which are only connected by means of two lines with the electronic unit 43, therefore can be readily arranged at a considerable distance from the electronic unit 43.

Of course, the apparatus can be modified in a number of different ways without departing from the teachings and underlying principles of the present invention. For instance, the tube 23 can be omitted, so that the one electrode of the capacitive measuring transducer is directly formed by the piston, or stated more exactly, by its piston rod.

With certain fields of application, for instance in the case of building or construction machines, it can be necessary that the cylinder be hingedly connected, at the location of the cap or closure 7 for pivotal movement with the frame of a machine. In this case, the electronic unit 43, instead of being arranged at the end face of the cylinder 1, also can be located at the region of the cylinder end at a peripheral location of the cylinder. Instead of using the pin 35 there then can lead radially out of the cylinder an electrical lead or bushing which is electrically insulated with respect to such cylinder.

Also, the input portion of the electronic unit 43 can be modified. For instance, the amplifier 59 and the capacitor 61 can be omitted. In the event that there is desired a range switching, this can be realized in a most simple manner in that, instead of the feedback capacitor 53, there are provided a number of switchable feedback capacitors.

Moreover, the current I, instead of being used for indicating the piston position, additionally can be employed for controlling or regulating any given control or regulating elements for an operating procedure.

Moreover, the electronic device or unit 43 also can be readily constructed such that instead of producing an impressed current it generates a voltage, whose value constitutes a measure for the piston position. Additionally, it is also possible to produce a digital electrical signal which constitutes a measure of the displacement of the piston.

While there are shown and described present preferred embodiments of the invention, it is to be distinctly understood that the invention is not limited thereto, but may be otherwise variously embodied and practiced within the scope of the following claims.

Accordingly, what I claim is:

1. The combination of:
a cylinder;
a piston displaceably guided therein and positionally adjustable by the action of a hydraulic fluid medium;
said piston being provided with a longitudinal opening;
a capacitive measuring transducer arrranged essentially in said cylinder;
said measuring transducer having two parts;
one of said parts of the measuring transducer being secured at said cylinder and extending into the longitudinal opening of said piston;
the other of said parts of said measuring transducer being secured to the piston;
said cylinder and said piston each having metallic parts;
one of the parts of the measuring transducer comprises a metallic, electrically conductive member and an insulating sheath which is adjacent to the other part of said measuring transducer and forms therewith a sliding seat extending over substantially the total length over which said two parts overlap each other;
the other part of said measuring transducer being provided with an electrical connection leading out of the cylinder and being electrically insulated with respect to the cylinder and the piston;
the part of the measuring transducer secured to the cylinder is provided with said connection which is electrically insulated with respect to the cylinder and the piston;
the part of the measuring transducer secured to the cylinder comprises an electrically conductive rod having an insulating sheath;
an electrically conductive tube arranged in the longitudinal opening of the piston and electrically conductively connected at the piston;
said rod protrudes into said tube;
said tube has an outer surface;
said longitudinal opening of the piston having an inner surface;
a free intermediate space being present between the outer surface of the tube and the inner surface of the longitudinal opening of the piston at least at that longitudinal section of the tube into which the rod protrudes; and
said tube consists of resiliently flexible material so that it is automatically centered by the rod.

2. The combination of:
a cylinder;
a piston displaceably guided therein and positionally adjustable by the action of a hydraulic fluid medium;
said piston being provided with a longitudinal opening;
a capacitive measuring transducer arranged essentially in said cylinder;
said measuring transducer having two parts;
one of said parts of the measuring transducer being secured at said cylinder and extending into the longitudinal opening of said piston;
the other of said parts of said measuring transducer being secured to the piston;
said cylinder and said piston each having metallic parts;
one of the parts of the measuring transducer comprises a metallic, electrically conductive member and an insulating sheath which is adjacent to the other part of said measuring transducer and forms therewith a sliding seat extending over substantially the total length over which said two parts overlap each other;

the other part of said measuring transducer being provided with an electrical connection leading out of the cylinder and being electrically insulated with respect to the cylinder and the piston;

an electronic unit arranged externally of the cylinder;

said electronic unit comprising:

an oscillator for producing an alternating current voltage;

a capacitive feedback differential amplifier having an inverting input and a non-inverting input;

said inverting input being connected with the part of the measuring transducer which is electrically insulated with respect to said cylinder;

said oscillator having an output;

said non-inverting input of said differential amplifier being connected with the output of said oscillator; and said oscillator having a connection which is electrically connected by parts of the cylinder and piston with the part of the measuring transducer which is conductively connected with the cylinder.

3. The combination as defined in claim 2, wherein: said electronic unit further comprises:

a capacitor having a first electrode and a second electrode;

said first electrode being connected with the part of the measuring transducer which is electrically insulated with respect to the cylinder;

said second electrode being connected with the output of the oscillator;

said second electrode of said capacitor, during operation, having infed thereto an alternating-current voltage which is equal in frequency and phase to the alternating-current voltage infed to the non-inverting input of the differential amplifier but of greater amplitude than such last-mentioned alternating-current voltage.

4. The combination as defined in claim 3, wherein:

said capacitive feedback differential amplifier has an output;

a further differential amplifier having inputs and inverting and non-inverting modes of operation;

the output of the capacitive feedback differential amplifier being connected with the inputs of said further differential amplifier;

switching means connected with said further differential amplifier and said oscillator and controllable by said oscillator, in order to switch said further differential amplifier in cycle with the oscillator frequency from the inverting mode of operation into the non-inverting mode of operation, so that the further differential amplifier demodulates the thereto infed output from said capacitive feedback differential amplifier.

5. The combination as defined in claim 4, further including:

at least one further differential amplifier connected between the output of the capacitive feedback differential amplifier and the inputs of the differential amplifier serving for demodulation.

6. An apparatus containing a cylinder, a displaceable piston provided with a longitudinal opening and being displaceable in the cylinder by means of a flow medium, a capacitive measuring transducer arranged essentially in the cylinder, which measuring transducer contains two mutually displaceable electrically conductive parts, of which the first is secured at the cylinder and extends into the longitudinal opening of the piston and the second part is connected with the piston and from which the second part protrudes into the lengthwise opening of the first, wherein the first measuring transducer part is electrically conductively connected with metallic parts of the cylinder and piston and the second measuring transducer part is electrically insulated in relation to the cylinder and the piston as well as guided, by means of an electrical connection out of the cylinder, wherein said second measuring transducer part is provided at its surface confronting the first measuring transducer part with an electrically insulating sleeve, which, together with said first measuring transducer part forms a sliding seat, and the lengthwise opening of said first measuring transducer part into which said second measuring transducer parts protrudes, is connected by at least one through passage, thus allowing pressure equalization with the inner space of the cylinder.

7. The apparatus according to claim 6, wherein said second measuring transducer part attached at the cylinder is formed by an electrically conductive rod provided with an insulating sleeve and the first measuring transducer part having the lengthwise opening is formed by a tube arranged in the lengthwise opening of the piston and electrically conductively connected therewith, wherein the lengthwise opening of the tube is connected at the region of its attached end by said passage with the internal space of the cylinder.

8. The apparatus according to claim 7, wherein between the outer surface of said tube and the inner surface of the longitudinal or lengthwise opening of the piston, at least at that longitudinal section of the tube into which said rod protrudes, a free intermediate space is present.

9. The apparatus according to claim 8, wherein said tube consists of a resiliently bendable material, so that it can be centered by said rod.

* * * * *